UNITED STATES PATENT OFFICE.

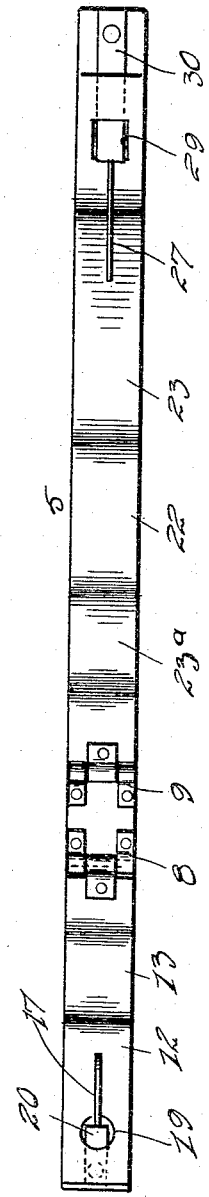

KARL W. FRANZ, OF FALL RIVER, WISCONSIN.

COW-TAIL HOLDER.

1,203,522.  Specification of Letters Patent.  Patented Oct. 31, 1916.

Application filed March 8, 1916. Serial No. 82,881.

*To all whom it may concern:*

Be it known that I, KARL W. FRANZ, a citizen of the United States, residing at Fall River, in the county of Columbia and State of Wisconsin, have invented certain new and useful Improvements in Cow-Tail Holders; and I do hereby declare the following to be a full, clear, and exact description of the invention, such as will enable others skilled in the art to which it appertains to make and use the same.

This invention has for its object to provide a simple and effective holder attachable to the leg of a cow for holding and preventing the tail of the animal being swished against the face and body of a milker.

With this and other objects in view, the invention consists in the novel construction, combination and arrangement of parts as will be hereinafter specifically described, claimed and illustrated in the accompanying drawing, in which:

Figure 1 represents a side elevation of the tail holder, and Fig. 2 represents a top plan view thereof, partly in section.

Referring to the drawing in detail, wherein similar reference numerals designate corresponding parts throughout the several views, the numeral 5 indicates one side member of the holder, which is constructed of a single piece of metal curved at two points adjacent one end, as indicated at 6 and 6ª, to partially embrace the leg of the animal above the gambrel joint and being curved adjacent the opposite end, as indicated at 7, to partially embrace the tail.

Intermediate the leg and tail-engaging portions of the side member 5 the latter is provided with pairs of spaced ears 8 and 9, in which are secured hinged rods 10 and 11, respectively. A tail clamping member 12 is pivotally secured to the hinge rod 10 and is curved, as indicated at 13, at a point opposite the curved portion 7 of the other side member 5 to co-act with the tail-engaging portion 7 in embracing the tail of the animal. The portion of the side member 5 lying outwardly of the tail-engaging portion 7 thereof is formed with a pair of slots 14 separated by a relatively narrow strip 15 on which is pivotally secured the looped end 16 of a pivoted rack bar 17, having inwardly directed teeth 18. The rack bar 17 is slidably mounted in an opening 19 in the adjacent end of the tail-clamping member 12 and the teeth 18 thereof are adapted to co-act with the edge of the opening 19 to retain the tail-engaging member 12 in adjusted position with relation to the adjacent extremity of the side member 5. A leaf spring 20 is rigidly secured at 21 to the end of the side member 5, extends through the opening 19 and engages the pivoted rack bar 17 for normally retaining the teeth 18 thereof in engagement with the edge of the opening 19.

A leg-engaging and clamping member 22 is hingedly secured to the other hinge rod 11 and is formed with curved portions 23 and 23ª arranged in opposed relation to the leg-engaging portions 6 and 6ª of the side member 5 and adapted to co-act therewith to embrace the leg of an animal. The end portion of the side member 5 lying outwardly of the leg-engaging portions 6 and 6ª thereof is formed with a pair of spaced blocks 24, defining a relatively narrow strip 25 on which is pivotally secured the looped end 26 of a swinging rack bar 27, having inwardly directed teeth 28. The rack bar 27 is slidably mounted in an opening 29 formed in the adjacent end of the leg-engaging member 12 and the teeth 28 thereof are adapted to co-act with the edge of the opening 29 to retain the leg-engaging member 22 in adjusted position with relation to the adjacent end of the side member 5. A leaf spring 30 is rigidly secured at 31 to the end of the side member 5 and engages the rack bar 27 to normally retain the teeth 28 thereof in engagement with the edge of the opening 29.

What I claim is:

A tail holder comprising a side member having leg and tail-engaging portions, said side member having pairs of slots formed adjacent the opposite ends thereof defining relatively narrow hinge strips, leg and tail-engaging members pivotally secured to said side member intermediate the leg and tail-engaging portions thereof and having openings adjacent the free ends thereof, rack bars pivotally secured to said strips and extending through the openings in said leg and tail-engaging members, and spring means normally retaining the teeth of said rack bars in engagement with the edges of said openings.

In testimony whereof I affix my signature in presence of two witnesses.

KARL W. FRANZ.

Witnesses:
HERBERT L. ZEIDLER,
DORA E. EDWARDS.

Copies of this patent may be obtained for five cents each, by addressing the "Commissioner of Patents, Washington, D. C."